United States Patent [19]

Hunter et al.

[11] Patent Number: 5,236,493

[45] Date of Patent: Aug. 17, 1993

[54] ANTIFOULING COATING

[75] Inventors: Julian E. Hunter, Newcastle-upon-Tyne; James Reid, Tyne and Wear, both of Great Britain; David E. J. Arnold, Newcastle-upon-Tyne, United Kingdom; George Hails, deceased, late of Newcastle-upon-Tyne, United Kingdom, by Patricia Hails, executrix; Kenneth F. Baxter, Sunderland, United Kingdom

[73] Assignee: Courtaulds Coatings (Holdings) Limited, United Kingdom

[21] Appl. No.: 684,645

[22] Filed: Apr. 12, 1991

Related U.S. Application Data

[63] Continuation-in-part of Ser. No. 418,852, Oct. 10, 1989, Pat. No. 5,116,407.

[30] Foreign Application Priority Data

Oct. 13, 1988 [GB] United Kingdom ................. 8824003
May 12, 1989 [GB] United Kingdom ................. 8910970

[51] Int. Cl.$^5$ .............................................. C09D 5/14
[52] U.S. Cl. .................................. 106/16; 106/18.32; 106/18.36; 523/122; 524/556; 524/560; 524/561; 524/562; 525/329.9
[58] Field of Search ................. 106/16, 18.32, 18.36; 523/122; 524/556, 560, 561, 562; 525/329.9

[56] References Cited

U.S. PATENT DOCUMENTS

| | | | |
|---|---|---|---|
| 2,490,924 | 12/1949 | Schertz | 424/196.1 |
| 2,490,925 | 12/1949 | Schertz | 424/196.1 |
| 2,492,939 | 12/1949 | Schertz | 530/220 |
| 2,513,429 | 7/1950 | Rosher | 428/274 |
| 2,772,260 | 11/1956 | Yeager | 530/221 |
| 2,772,261 | 11/1956 | Yeager | 530/221 |
| 2,772,262 | 11/1956 | Yeager | 530/221 |
| 2,772,263 | 11/1956 | Yeager | 530/221 |
| 2,772,264 | 11/1956 | Yeager | 530/221 |
| 3,691,123 | 9/1972 | Clarke et al. | 524/545 |
| 3,968,298 | 7/1976 | Reinert et al. | 428/270 |
| 4,130,524 | 12/1978 | Boerwinkle et al. | 260/29.6 HN |
| 4,172,177 | 10/1979 | Sato | 428/413 |
| 4,400,216 | 8/1983 | Arora | 106/23 |
| 4,474,916 | 10/1984 | Streit et al. | 524/130 |
| 4,485,131 | 11/1984 | Adams et al. | 427/388.2 |
| 4,522,972 | 6/1985 | Mondt et al. | 524/548 |
| 4,561,981 | 12/1985 | Characklis | 210/696 |
| 4,598,020 | 7/1986 | Panush | 428/411.1 |
| 4,675,051 | 6/1987 | Baxter | 106/16 |
| 4,675,374 | 6/1987 | Nichols | 528/119 |
| 4,687,789 | 8/1987 | Gonnet et al. | 523/122 |
| 4,898,895 | 2/1990 | Masuoka et al. | 523/122 |
| 4,904,742 | 2/1990 | Perichaud et al. | 525/331.4 |

FOREIGN PATENT DOCUMENTS

| | | |
|---|---|---|
| 0069559 | 1/1983 | European Pat. Off. . |
| 0232006 | 8/1987 | European Pat. Off. . |
| 51-080849 | 1/1975 | Japan . |
| 54-110322 | 2/1978 | Japan . |
| 54-64633 | 5/1979 | Japan . |
| 01103672 | 7/1988 | Japan . |
| 7403333 | 3/1974 | Netherlands . |
| WO8402915 | 8/1984 | PCT Int'l Appl. . |
| 1457590 | 12/1976 | United Kingdom . |

Primary Examiner—William R. Dixon, Jr.
Assistant Examiner—Anthony J. Green
Attorney, Agent, or Firm—Eckert Seamans Cherin & Mellott

[57] ABSTRACT

An antifouling coating composition comprising a binder comprising a non-volatile amine and rosin or maleinised or fumarised rosin. The non-volatile amine is preferably an amine of the formula I $$R^1-\underset{\underset{R^3}{|}}{\overset{\overset{R^2}{|}}{N}}\quad\quad (I)$$

where $R^1$ is a monovalent hydrocarbon group derived from a diterpene and $R^2$ and $R^3$ are hydrogen, alkyl or aryl, preferably present in a proportion by weight of 9:1 to 1:9 relative to the rosin or maleinised or fumarised rosin.

19 Claims, No Drawings

ANTIFOULING COATING

This is a continuation-in-part of U.S. Ser. No. 418,852, filed Oct. 10, 1989, now U.S. Pat. No. 5,116,407.

FIELD OF THE INVENTION

This invention relates to antifouling coatings. An antifouling coating is used as a top coat on ships' hulls to inhibit the settlement and growth of marine organisms such as barnacles and algae, generally by release of a biocide for the marine organisms.

PRIOR ART

Traditionally, antifouling coatings have comprised a relatively inert binder with a biocidal pigment which is leached from the paint. Among the binders which have been used are vinyl resins, particularly a vinyl chloride/vinyl acetate copolymer, and rosin. The vinyl resins are seawater-insoluble and paints based on them use a high pigment concentration so that there is contact between pigment particles to ensure leaching. Rosin is a hard brittle resin which is slightly soluble in seawater. The biocidal pigment is very gradually leached out of the matrix of rosin binder in use, leaving a skeletal matrix of rosin which becomes washed off the hull surface to allow leaching of the biocidal pigment from deep within the paint film. Antifouling coatings having a high proportion of rosin in the binder are liable to cracking of the paint film.

The most successful antifouling paints in recent years have been "self-polishing copolymer" paints based on a polymeric binder to which biocidal triorganotin moieties are chemically bound and from which the biocidal moieties are gradually hydrolysed by seawater, as described for example in British Patent 1457590. The polymer from which the triorganotin moieties have been hydrolysed becomes soluble in seawater, so that as the outermost paint layer becomes depleted of biocide it is swept off the surface of the hull by the movement of the ship through seawater, exposing a fresh layer of active paint. Such paints generally give a more sustained antifouling effect than rosin-based paints and at least maintain their initial smoothness in use. Self-polishing copolymer paints which release non-biocidal moieties are described in European Patent 69559 and European Patent Application 232006 and International Patent Application WO84/02915.

U.S. Pat. No. 2,490,925 (Schertz) discloses a pest control composition comprising stabilised rosin amine or a coordinate covalent metal salt thereof, for example a dehydroabietylamine complex of copper acetate, dispersed in kerosine, gasoline, benzene, alcohol, acetone, water or pine oil. The composition is stated to be particularly effective as a fungicide. The composition can be added to marine paint.

Japanese Published Unexamined Patent Application 54-64633 describes a marine antifouling biocide which is a long-chain (12 to 18 carbon atoms) linear aliphatic primary amine or salt thereof. Japanese Published Unexamined Patent Application 54-110322 describes certain long-chain (12 to 18 carbon atoms) linear aliphatic secondary and tertiary amines as marine antifouling agents.

U.S. Pat. No. 4,675,051 describes a marine antifouling paint which is gradually dissolved in seawater and which comprises a binder which is a resin containing an amidoamine or imidazoline group produced by the reaction of rosin and an aliphatic polyamine containing at least one primary or secondary amine group.

SUMMARY OF THE INVENTION

The present invention provides an antifouling coating showing a sustained antifouling effect and maintaining in use a paint film of superior properties to an antifouling coating whose matrix is rosin.

An antifouling coating composition according to one aspect of the invention comprises a marine biocide and a binder comprising a salt of rosin or maleinised or fumarised rosin with a substantially non-volatile monoamine, the proportion of rosin or maleinised or fumarised rosin to the monoamine in the binder being in the range 1:9 to 9:1 by weight.

The combination of rosin or maleinised or fumarised rosin with a substantially non-volatile monoamine leads to formation of a salt between the acid groups of rosin, which consists largely of abietic acid mixed with other diterpene acids, and the amine. We have found that the salt of rosin and the non-volatile monoamine dissolves more smoothly and slowly in seawater than rosin itself and is less liable to cracking of the paint film in use on a ship's hull.

An antifouling coating composition according to another aspect of the invention is characterised in that the binder comprises an amine of the formula:

$$R^1-\underset{\underset{R^3}{|}}{N}-R^2 \qquad (I)$$

where $R^1$ is a monovalent hydrocarbon group derived from a diterpene and $R^2$ and $R^3$ are each independently hydrogen, an alkyl group having 1 to 18 carbon atoms or an aryl group having 6 to 12 carbon atoms, and rosin or maleinised or fumarised rosin.

The antifouling coating composition is usually a paint containing a pigment dispersed in a binder as described above but can alternatively be a clear varnish.

DETAILED DISCLOSURE

The substantially non-volatile monoamine can be a primary, secondary or tertiary amine. It is substantially non-volatile at ambient temperature (20° C.) and standard pressure and preferably has a boiling point of at least 200° C., most preferably at least 250° C. Many non-volatile amines have marine biocidal properties, for example the amines of formula (I) above and aliphatic amines comprising an alkyl or alkenyl group having a chain length of 12 to 16 carbon atoms. Usually, the marine biocidal properties will be an added advantage of use of the amine. In some cases it may be preferred to use a non-biocidal amine in conjunction with a known marine biocide which has been approved by regulations for use in antifouling paints. Non-volatile amines containing no chain of 8 or more carbon atoms, for example hydroxy-substituted amines, are generally non-biocidal. Aliphatic amines comprising an alkyl or alkenyl group having a chain length of 18 to 20 carbon atoms are relatively non-biocidal compared to the C12-16 alkyl or alkenyl amines and the amines of formula (I), as are secondary or tertiary amines containing more than one long-chain alkyl or alkenyl group.

The most preferred non-volatile amines are those of formula (I). The amines of formula (I) have the physical properties necessary for a paint film binder, and their mixtures or salts with rosin form stronger films than rosin itself. The amine of formula (I) is preferably derived from rosin and can be a primary, secondary or tertiary amine. A primary amine derived from rosin is dehydroabietylamine, sold commercially as "Rosin Amine D". Its main constituent is:

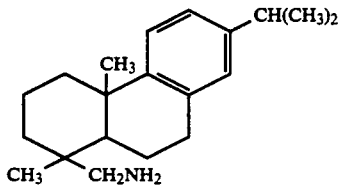

A corresponding secondary or tertiary amine, for example an N-methyl or N,N-dimethyl derivative of Rosin Amine D, can alternatively be used.

The amines of formula (I) are much more effective marine biocides than the amidoamines disclosed in U.S. Pat. No. 4,675,051. A mixture of amine of formula (I) and rosin or maleinised or fumarised rosin can be used as a clear antifouling varnish to be applied to ships' hulls or other marine surfaces. Such a mixture can also be used as a paint binder with pigments, which may or may not have antifouling activity. The amines described in the above-mentioned Japanese Patent Applications 54-64633 and 54-110322 are not suitable for use alone as binders for antifouling paints or varnishes because they do not dry to a tack-free film when applied as a coating.

The binder preferably comprises 10-90%, more preferably 15-85%, by weight of the amine of formula (I) and 90-10%, preferably 85-15%, by weight of the rosin or maleinised or fumarised rosin. Most preferably the binder comprises at least 20% by weight of the amine of formula (I), for example 35-80%. Most preferably the binder comprises at least 20% by weight rosin, particularly 40-80%. Rosin, for example that sold commercially as WW Rosin and containing a high proportion of abietic acid, is generally preferred to maleinised or fumarised rosin. If maleinised or fumarised rosin is used as the rosin acid, the preferred proportion of rosin acid to amine may be somewhat lower than when rosin is used.

We have found that the amines of formula (I) are effective biocides for marine fouling organisms (for algal and animal fouling species) from tests in which the slime-forming algae *Amphora coffeaeformis* and the marine animal Artemia sp. are cultured in seawater previously in contact with the amine. When the amine of formula (I) is used alone as the binder of an antifouling coating, however, the paint film in service does not dissolve in seawater sufficiently rapidly to give sustained release of biocide. The combination of the amine of formula (I) with rosin or maleinised or fumarised rosin leads at least partially to formation of a salt of the amine and the rosin. Surprisingly, this combination of the amine of formula (I) with rosin has more sustained antifouling properties than the amine of formula (I) itself. We believe that the salt of the amine and rosin dissolves in seawater slightly more rapidly than a film of the amine itself, and that the salt is dissociated as it dissolves to release the amine of formula (I) as an active antifouling agent. Moreover, coatings using as binder the combination of the amine of formula (I) with rosin dissolve in seawater more slowly and more smoothly than coatings using rosin alone as binder. The coatings using as binder the combination of the amine of formula (I) with rosin also show superior film properties (less cracking of the coated film) compared with paints using rosin alone as binder.

The amine of formula (I) and rosin or maleinised or fumarised rosin can also be used as a mixture with one or more other substantially non-volatile amines in forming a binder for an antifouling paint according to the invention, for example a long-chain (12 to 20 carbon atoms) aliphatic amine such as dodecyl amine, hexadecyl amine, octadecyl amine or oleyl amine, or a mixture of such amines, for example those sold as tallow amine, hydrogenated tallow amine, cocoamine (coconut amine), N-methyl cocoamine or N,N-dimethyl cocoamine. Although such long-chain amines are not suitable as paint binders or as varnishes when used alone, they may be useful in plasticising diterpene amines such as Rosin Amine D and mixtures thereof with rosin or in plasticising rosin itself. The weight ratio of the amine of formula (I) to the long-chain amine is preferably at least 1:1, for example 3:2 to 9:1. The long-chain aliphatic amine or the like is preferably present in an amount of from 5 to 50% by weight based on the weight of binder (including amine). One preferred form of antifouling paint binder or antifouling varnish according to the invention comprises a mixture of an amine of formula (I) with rosin and a long-chain aliphatic amine, for example a mixture of 10-90% Rosin Amine D, 5-65% rosin and 1-50%, preferably 5-50%, of the aliphatic amine, by weight.

The antifouling paint binder or varnish can alternatively contain a mixture of the amine of formula (I) and rosin or maleinised or fumarised rosin with a high molecular weight, preferably polymeric, polyamine. Such polyamines are available commercially as curing agents, particularly for epoxy resins. The "Versamid" polyamines derived from dimer fatty acids are often aminofunctional. The polyamides sold under the Trade Mark "Casamid" are alternative amino-functional polyamides which are used as curing agents and are water-dispersible. These polyamines sold as curing agents are generally too sticky to be used alone as paint binders of varnishes but form a satisfactory film when used as a mixture with a diterpene amine such as Rosin Amine D. We have found that the "Casamid" polyamines such as "Casamid 360" have marine biocidal properties. Although these polyamines are less effective marine biocides than the amines of formula (I), the mixture provides a binder or varnish in which two components have marine biocidal properties as well as film-forming properties. In such mixtures the weight ratio of the amine of formula (I) to the polymeric polyamine is preferably at least 1:1, more preferably 3:2 to 9:1.

The binder of the antifouling coating composition according to the invention can alternatively be a salt of rosin or maleinised or fumarised rosin with a different amine, for example a C12-16 aliphatic amine which acts as a marine biocide or a non-biocidal amine such as a short-chain hydroxy-substituted amine. Examples of particularly effective marine biocidal amines are dodecylamine, tetradecylamine, hexadecylamine, cocamine and N,N-dimethylcocoamine. Examples of non-biocidal amines are triethanolamine and diethanolamine. Amines which are not film-formers in themselves should preferably not be used in stoichiometric excess with respect to the acid groups in rosin. They can for example be used at 25-100% of the stoichiometric amount.

In the binder of the antifouling coating composition according to the invention the salt of a non-volatile amine such as an amine of formula (I) with rosin or maleinised or fumarised rosin can further be mixed with a hydrophilic water-insoluble film-forming resin, for example a vinyl ether polymer such as a vinyl acetate/vinyl isobutyl ether copolymer such as that sold under the Trade Mark "Laroflex". The amine and rosin can also be used in conjunction with a less water-sensitive resin such as a vinyl chloride polymer, particularly a vinyl chloride/vinyl acetate copolymer, or a polyamide, particularly a polyamine formed from a dimer fatty acid such as those sold under the Trade Mark "Versamid". In this case it may be preferred to use a high pigment volume concentration of a pigment which is slightly soluble in or reactive with seawater such as cuprous oxide and/or zinc oxide. The binder can also include a non-toxic self-polishing polymer as described in U.S. Pat. No. 4,593,055 or European Patent Application 232006, or an organotin self-polishing copolymer as described in British Patent 1457590.

Since the combination of the amine of formula (I) and rosin or maleinised or fumarised rosin acts both as a marine biocide and as a film-forming binder, it can be used in a wide range of antifouling coating formulations. It can for example be used as a clear varnish or with pigments chosen for their colour and opacity. Alternatively, it can be used with an added marine biocide which may be dissolved in the binder or a pigment dispersed in the binder. The salts of rosin or maleinised or fumarised rosin with a substantially non-volatile monoamine which is an effective marine biocide can be used similarly. The salts of rosin or maleinised or fumarised rosin with a non-biocidal non-volatile monoamine must be used with an added marine biocide. For most antifouling uses, the preferred coating compositions according to the invention are those containing a pigment which acts as a marine biocide.

The substantially non-volatile monoamine, for example an amine of formula (I), is preferably pre-mixed with the rosin or maleinised or fumarised rosin to form the paint binder comprising rosin amine salt before being mixed with pigment. Alternatively, the non-volatile monoamine and the rosin or maleinised or fumarised rosin can be mixed simultaneously with pigment. Mixing is generally carried out using conventional paint-blending procedures to provide a composition having a pigment volume concentration of, for example, 25 to 55%. The pigment is preferably a sparingly soluble pigment having a solubility in seawater of from 0.5 to 100, most preferably 1 to 10, parts per million by weight. Examples of preferred pigments are metalliferous pigments such as cuprous oxide, cuprous thiocyanate, zinc oxide, zinc ethylene bis(dithiocarbamate), zinc dimethyldithiocarbamate, zinc diethyldithiocarbamate or cuprous ethylene bis(dithiocarbamate). These sparingly soluble pigments which are copper and zinc compounds are generally marine biocides. The sparingly soluble metalliferous pigments produce water-soluble metal compounds on reaction with seawater so that the pigment particles do not survive at the paint surface. Mixtures of sparingly soluble pigments can be used, for example cuprous oxide, cuprous thiocyanate or zinc ethylene bis(dithiocarbamate), hich are highly effective biocidal pigments, can be mixed with zinc oxide, which is less effective as a biocide but dissolves slightly more rapidly in seawater. The amine of formula (I) and the rosin or maleinised or fumarised rosin can be mixed with a basic pigment such as cuprous oxide or zinc oxide without gelation of the binder.

The paint composition can additionally or alternatively contain a pigment which is not reactive with seawater and may be highly insoluble in seawater (solubility below 0.5 part per million by weight) such as titanium dioxide or ferric oxide or an organic pigment such as a phthalocyanine pigment. Such highly insoluble pigments are preferably used at less than 40% by weight of the total pigment component of the paint, most preferably less than 20%.

The antifouling paint can also contain a non-metalliferous biocide for marine organisms, for example tetramethyl thiuram disulphide, methylene bis(thiocyanate), captan, a substituted isothiazolone or 2-methylthio-4-t-butylamino-6-cyclopropylamino-s-triazine.

The antifouling coating of the invention is generally applied from a solution in an organic solvent, for example an aromatic hydrocarbon such as xylene or trimethylbenzene, an aliphatic hydrocarbon such as white spirit, an ester such as butyl acetate, ethoxyethyl acetate or methoxypropyl acetate, an alcohol such as butanol or butoxy-ethanol or a ketone such as methyl isobutyl ketone or methyl isoamyl ketone.

Alternatively, the antifouling composition of the invention can be an aqueous composition containing water and water-miscible cosolvent. Examples of cosolvents which can be used are alcohols such as butanol, glycol ethers such as methoxypropanol, methoxyethanol, butoxyethanol and ethoxyethanol and esters thereof such as methoxypropyl acetate. The amines of formula (I) and their mixtures with rosin are soluble in such mixtures of water and cosolvent but are substantially insoluble in water. Aqueous compositions comprising as binder a mixture of an amine of formula (I), rosin and a water-dilutable polyamine such as "Casamid 360" need only a low level of organic cosolvent, for example less than 200 g per liter.

The invention is illustrated by the following Examples.

EXAMPLE 1

30% by volume Rosin Amine D and 20% by volume rosin were dissolved in 50% by volume "Shellsol" to form a clear antifouling varnish containing a salt of rosin (abietic acid) and Rosin Amine D (dehydroabietyl amine) capable of gradually dissolving from a ship's hull on prolonged use in seawater.

EXAMPLES 2 to 4

Following the procedure of Example 1, clear antifouling varnishes were produced containing Rosin Amine D and rosin in the following proportions by volume:

| Example 2 | Rosin Amine D:Rosin = 80:20 |
| Example 3 | Rosin Amine D:Rosin = 40:60 |
| Example 4 | Rosin Amine D:Rosin = 20:80 |

The antifouling varnishes of Examples 1 to 4 were each sprayed onto plaques, forming a clear coating film in each case. As Comparative Examples A and B respectively, Rosin Amine D alone and rosin alone were sprayed onto similar plaques. The plaques were attached to a metal plate which was immersed in the sea at a site off the coast of England rich in fouling organisms. After 5 months' immersion the plaques were inspected and had the following results:

| | |
|---|---|
| Comparative Example A | Algal and animal fouling covering about 40% of the area of the plaque. |
| Comparative Example B | Extensive algal and animal fouling covering most of the plaque. |
| Example 1 | Clean of fouling organisms except for some limited slime cover. |
| Example 2 | Some algal and animal fouling (10 to 20% of the area of the plaque). |
| Example 3 | Free from fouling. |
| Example 4 | Free from fouling |

The coatings of Examples 1 to 4 according to the invention thus showed substantially increased antifouling performance compared to rosin alone or Rosin Amine D alone.

EXAMPLE 5

A mixture of 80% by volume Rosin Amine D and 20% by volume rosin was dissolved in xylene and milled with a mixture of 93% by volume cuprous oxide and 7% by volume zinc oxide to give a paint of solids content 47% by volume and pigment volume concentration 47% (that is 47% by volume pigment in the dried paint film).

EXAMPLE 6

Example 5 was repeated using a mixture of 80% by volume rosin and 20% by volume Rosin Amine D.

The paints of Examples 5 and 6 were sprayed onto the plaques and immersed in the sea in an area rich in marine fouling as described above. They were still free of fouling after 12 months.

The paints of Examples 5 and 6 were also tested in a rotor test of the type described in British Patent 1457590. In comparative tests, paints were prepared using Rosin Amine D alone and rosin alone in place of the mixture of Rosin Amine D and rosin. Stripes of the paints of Examples 5 and 6 and of the comparative paints were applied on the same disc in the rotor test. The paints of Examples 5 and 6 showed a gradual decrease in film thickness due to slow dissolution of the binder in seawater. The paint of Example 5 decreased in thickness at a rate half that of a successful commercial self-polishing copolymer antifouling paint. The paint of Example 6 decreased in thickness at a rate identical to that of the commercial paint. Both these paints showed a rate of dissolution in the range consistent with a sustained release of biocide to prevent fouling.

The comparative paint based on Rosin Amine D alone was measured as having a rate of decrease of thickness less than a quarter of that of the commercial paint. Such a low result means that there is doubt whether dissolution of the paint film is truly taking place, and in any case is insufficient to give sustained release of biocide.

The comparative paint based on rosin alone decreased in film thickness about 2.4 times as fast as the commercial paint. This rate of dissolution is too fast for a commercial paint intended to remain active between formal drydocking intervals (18-24 months). This paint also showed cracks in the paint film immediately after the drying of the film.

EXAMPLE 7

Rosin, Rosin Amine D and cocoamine (a mixture of C12, C14 and C16 primary amines) were dissolved in xylene and milled with pigment to form an antifouling paint having the following composition:

| | % by weight |
|---|---|
| Rosin | 9.25 |
| Rosin Amine D | 3.05 |
| Cocoamine | 2.4 |
| Pigment (cuprous and zinc oxides) | 76.6 |
| Xylene | 8.7 |

EXAMPLE 8

Example 7 was repeated using an equal weight of N,N-dimethylcocoamine in place of the cocoamine.

The paints of Examples 7 and 8 were sprayed onto plaques and immersed in the sea in an area rich in fouling organisms. The plaques were free from fouling after 14 months' immersion.

The paint of Example 7 was sprayed as a test patch below the waterline on the side of the hull of an oil tanker. After 12 months in service the test patch was inspected and was seen to be free from fouling.

It is claimed:

1. An antifouling coating composition comprising a binder having a solid pigment dispersed therein, wherein the binder comprises 10 −90 % by weight of an amine of the formula (I)

where $R^1$ is a monovalent hydrocarbon group derived from a diterpene and $R^2$ and $R^3$ are each independently hydrogen, an alkyl group having 1-18 carbon atoms or an aryl group having 6-12 carbon atoms, and 10-90% by weight of rosin or maleinised or fumarised rosin.

2. An antifouling coating composition according to claim 1, wherein the amine of formula (I) is dehydroabietyl amine.

3. An antifouling coating composition according to claim 1, wherein the binder comprises at least 20% by weight of the said amine of formula (I).

4. An antifouling coating composition according to claim 3, wherein the binder comprises 35-80% by weight of the amine of formula (I).

5. An antifouling coating composition according to claim 1, wherein the binder comprises at least 20% by weight rosin.

6. An antifouling coating composition according to claim 5, wherein the binder comprises 40-80% by weight rosin.

7. An antifouling coating composition according to claim 1, wherein the composition additionally contains a polymeric polyamine.

8. An antifouling coating composition according to claim 1, wherein the composition additionally contains 5-50% by weight, based on the total weight of binder (including amine), of an aliphatic amine having 12-20 carbon atoms.

9. An antifouling coating composition according to claim 1, wherein the pigment is a copper or zinc compound which has a solubility in seawater of 0.5 to 100 parts per million by weight.

10. An antifouling coating composition comprising a binder having a solid pigment dispersed therein, wherein the binder comprises 10-90% by weight of an amine of formula (I)

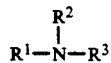  (I)

where $R^1$ is a monovalent hydrocarbon group derived from a diterpene and $R^2$ and $R^3$ are each independently hydrogen, an alkyl group having 1-18 carbon atoms or an aryl group having 6-12 carbon atoms, 5-65% by weight of rosin and 5-50% by weight of an aliphatic amine having 12-20 carbon atoms.

11. An antifouling coating in the form of a clear varnish of a film-forming binder, wherein the binder comprises 10-90% by weight of an amine of formula (I)

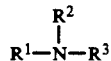  (I)

where $R^1$ is a monovalent hydrocarbon group derived from a diterpene and $R^2$ and $R^3$ are each independently hydrogen, an alkyl group having 1-18 carbon atoms or an aryl group having 6-12 carbon atoms, and 10-90% by weight of rosin or maleinised or fumarised rosin.

12. An antifouling clear varnish according to claim 11, wherein the binder comprises 20-80% by weight dehydroabietylamine and 20-80% by weight rosin.

13. An antifouling coating composition comprising a solid pigment having a solubility in seawater of less than 100 parts per million by weight which is a biocide for marine organisms or which is present together with a biocide for marine organisms, the pigment being dispersed in a binder comprising a salt of rosin or malleinised or fumarised rosin with a non-volatile monoamine, the proportion of rosin or maleinised or fumarised rosin to the monoamine in the binder being in the range 1:9 to 9:1 by weight.

14. An antifouling coating composition according to claim 13, wherein the binder contains at least 20% by weight rosin.

15. An antifouling coating composition according to claim 14, wherein the proportion of rosin or maleinised or fumarised rosin to the monoamine in the binder is in the range 40:26 to 80:20 weight.

16. An antifouling coating composition according to claim 13, wherein the amine is dehydroabietyl amine.

17. An antifouling coating composition according to claim 13, wherein the amine is an aliphatic amine comprising an alkyl or alkenyl group having a chain length of 12 to 16 carbon atoms.

18. An antifouling coating composition according to claim 13, wherein the amine is a hydroxy-substituted amine containing no chain of 8 or more carbon atoms.

19. An antifoulding coating composition according to claim 13, wherein the marine biocide is a copper or zinc compound which has a solubility in seawater of 0.5 to 100 parts per million by weight.

* * * * *